C. W. BERGMANN.
POWER HACKSAW.
APPLICATION FILED JAN. 13, 1908.

944,069.  Patented Dec. 21, 1909.
2 SHEETS—SHEET 1.

Witnesses:
J. A. McIntyre.
Daniel E. Daly.

Inventor:
Charles W. Bergmann
by Lynch & Dore
his Attorneys.

C. W. BERGMANN.
POWER HACKSAW.
APPLICATION FILED JAN. 13, 1908.

944,069.

Patented Dec. 21, 1909.
2 SHEETS—SHEET 2.

Witnesses:
J. A. McIntyre
David E. Haly.

Inventor:
Charles W. Bergmann
by Lynch & Dorr
his Attorneys.

UNITED STATES PATENT OFFICE.

CHARLES W. BERGMANN, OF CLEVELAND, OHIO.

POWER-HACKSAW.

944,069.  Specification of Letters Patent.  Patented Dec. 21, 1909.

Application filed January 13, 1908. Serial No. 410,491.

*To all whom it may concern:*

Be it known that I, CHARLES W. BERGMANN, a citizen of the United States of America, residing at Cleveland, in the county of Cuyahoga and State of Ohio, have invented certain new and useful Improvements in Power-Hacksaws; and I hereby declare the following to be a full, clear, and exact description of the invention, such as will enable others skilled in the art to which it pertains to make and use the same.

This invention relates to power hack saws of the type in which the saw is reciprocated by suitable mechanism in a frame or carrier which is free to move in a vertical plane.

One of the objects of the invention is to provide a saw which is strong and durable, and to provide means whereby the frame which carries the reciprocating saw is well supported and guided in its vertical movement so that the saw will always cut in the same vertical plane.

Further objects will appear from the following detail description.

In carrying out my invention I mount the saw in a movable frame or carrier which is preferably pivoted at one end to the driving shaft supported at one end of the main stationary frame or table upon which the work or object to be cut may be clamped. At the opposite end of the frame or table I provide a pair of vertical guides for the free end of the movable frame. These guides between which the end of the frame passes when the saw is fed downward during the cutting operations or when the frame is shifted by hand insures the saw cutting always in the same vertical plane. The pressure of the saw upon the work and consequently the rate of feed may be varied by an adjustable frame toward or away from its pivotal support. Suitable mechanism is provided for automatically stopping the saw when the cutting operation is completed.

My invention may be further briefly summarized as consisting in certain novel details of construction, and combination and arrangement of parts, which will be described in the specification and set forth in the appended claims.

Figure 1:
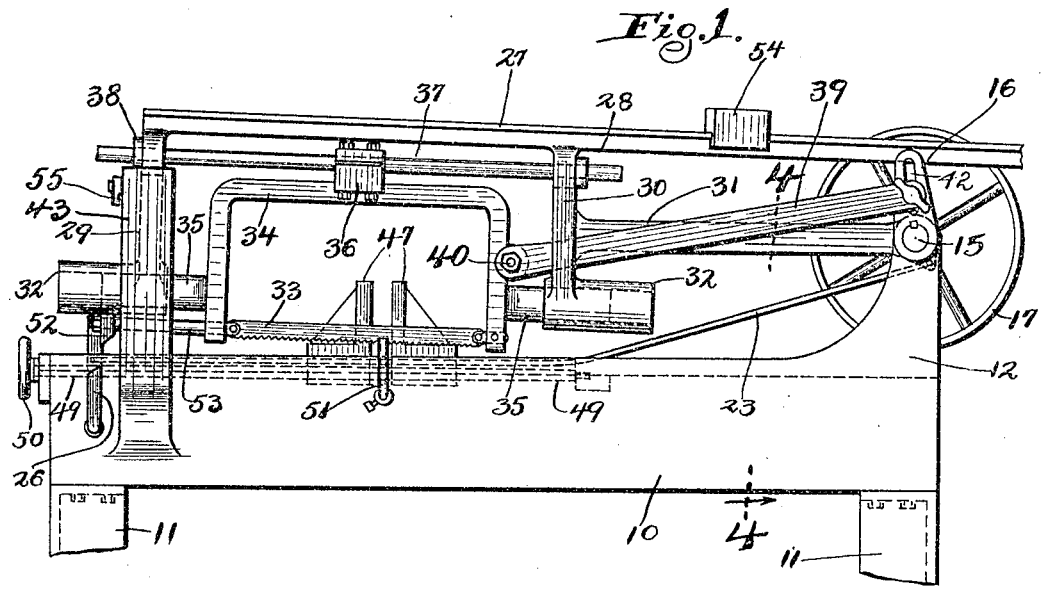
Figure 2:
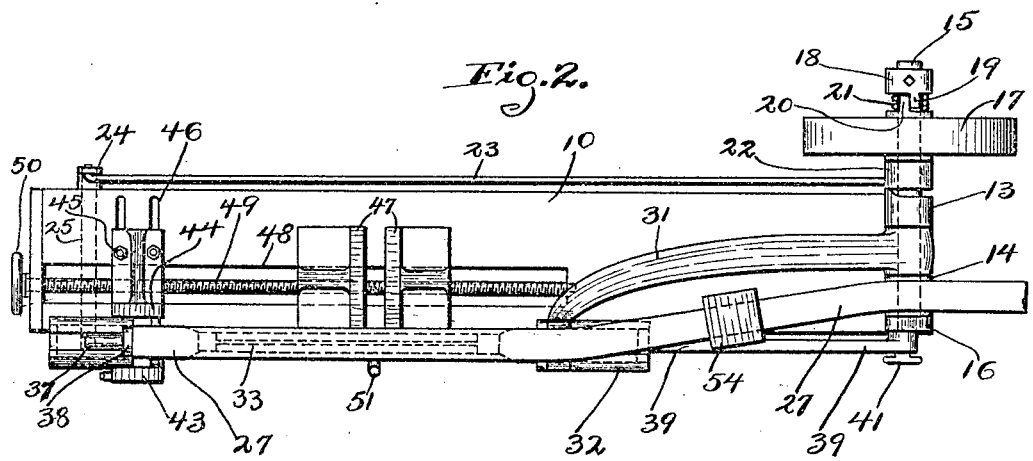
Figure 3:
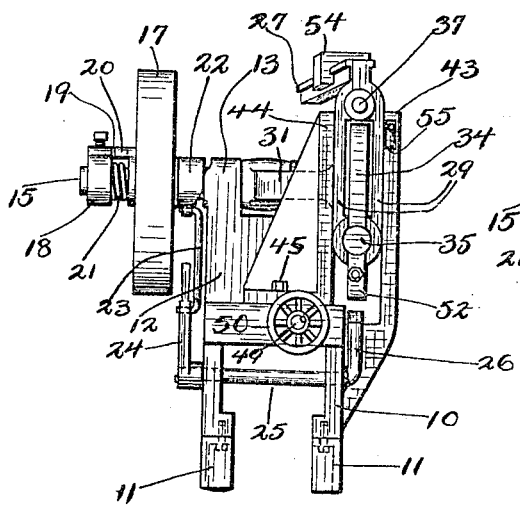
Figure 4:
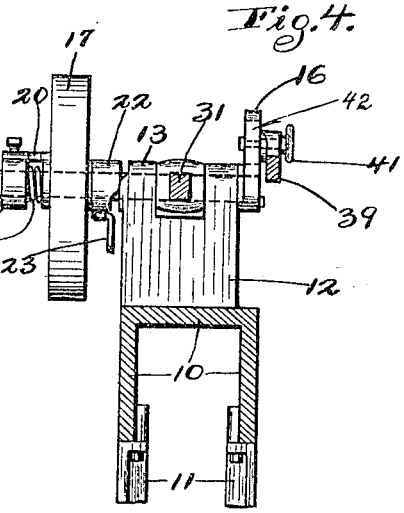

In the drawings Figure 1 is a side elevation of the power hack saw equipped with my invention. Fig. 2 is a plan view of the same. Fig. 3 is an end view of the same. Fig. 4 is a vertical section on the line 4—4, Fig. 1, looking in the direction indicated by the arrow.

Referring now to the figures of the drawing 10 represents the main stationary frame or table of the saw supported on legs 11. The frame is preferably provided with a flat horizontal top on which the work or object to be sawed is clamped, and at one end with a standard or upright 12 provided with two spaced bearing sleeves 13 and 14, in which is supported an operating or driving shaft 15. To one end of the shaft, at one side of the frame is secured a crank 16 and near the opposite end of the shaft is a loose pulley 17, which is adapted to be clutched to the shaft and unclutched as is desired. Secured to the end of the shaft adjacent the pulley is a collar 18 provided with one or more inwardly extending clutch teeth or projections 19. The hub of the pulley is provided with one or more similar clutch teeth or projections 20 which co-acts with the teeth 19 to form therewith a driving connection for the pulley. A spring 21 intermediate the collar 18 and hub of the pulley tends to force the pulley away from the collar and to hold the clutch teeth out of engagement. Between the hub of the pulley and the bearing sleeve 13 is a loose sleeve or collar 22. The adjacent faces of the sleeve 22 and bearing sleeve 13 are provided with cam surfaces which are so constructed that when the sleeve 22 is in one position the pulley is shifted against the tension of the spring, so that the clutch teeth are in engagement, and when shifted to another position, the pulley is moved along the shaft by the pressure of the spring until the clutch teeth are out of engagement. The sleeve 22 is connected to an operating rod 23 which extends to the opposite end of the saw frame or table and is connected to a hand lever 24 mounted upon one end of a shaft 25 carried by the frame. The shaft 25 extends beyond the side of the frame and is provided with an upwardly projecting end 26 which will be struck by the saw when the latter has passed through the work or when the cut is completed, so that the pulley will be unclutched and the saw stopped as will be explained more fully.

The movable frame which carries the reciprocating saw is shown at 27 and it consists principally of a flanged bar or rod 28 provided with a pair of spaced downwardly projecting arms 29 and 30 from the latter of which extends toward the rear end of the frame a supporting arm 31, which is pivotally mounted upon the operating shaft 15 intermediate the bearing sleeves 13 and 14. The free end of the flanged rod 28 extends rearwardly beyond the shaft 15 and serves as means for lifting the forward part of the frame from the rear of the machine. The lower end of the arms 29 and 30 are provided with oppositely extending bosses 32 and 33 having openings or sockets in alinement with each other.

The saw proper, shown at 33, is secured between the lower ends of an inverted U-shaped frame or yoke 34, which is adapted to be reciprocated between the arms 29 and 30. The ends of the yoke are provided with outwardly extending trunnion-like studs or projections 35 which extend into the sockets or openings in the bosses 32 carried by the arms 29 and 30. The upper part of the yoke 34 is secured to a box clamp 36, which in turn is secured to a rod 37 mounted for reciprocating movement in bearings 38 secured in alined openings in the upper portions of the arms 29 and 30. The saw is reciprocated by a pitman 39 which is pivoted at 40 to the yoke, passes through the arm 30, and is secured at its opposite end to a wrist pin 41 adjustably secured in an elongated slot 42 in the crank 16. Thus it will be seen that by adjusting the pin 41 in the slot 42 the length of the stroke can be varied.

In order that the outer free end of the movable frame 27 which supports the saw will be well supported and line of cut will be true and always in the same vertical plane, I provide for the outer end of the frame, guides 43 and 44. The guide 43 consists of an arm or standard which is preferably integral with the frame or table 10 and extends upwardly from the side thereof. The guide 44 consists of a standard which is adjustably secured to the horizontal top of the frame by means of screws 45, which pass through elongated slots 46 in the top of the frame. The adjacent faces of the uprights or guides 43 and 44 are parallel and receive closely the outer end of the pivoted frame 27 so that the latter may move freely between said uprights but still will be held in the proper position.

The work or piece to be cut is clamped to the top of the frame or table 10 by means of a pair of clamping blocks 47 which extend down into an elongated slot 48 parallel to the plane of the cut. The clamping blocks may be shifted toward and away from each other by means of a long screw 49 and a hand wheel 50 at the forward end of the frame or table. Projecting upward from the side of the frame or table opposite the clamping blocks 47 and extending above the top of the former is an adjustable stop or gage 51 against which the work can be pressed. The saw and the portion of the pivoted or rocking frame 27 which supports the same is located at one side of the frame or table. When the cut is completed and the edge of the saw is below the horizontal top of the table, the hand lever is automatically tripped, the pulley unclutched, and the saw stopped by means of a projection 52 which is secured to the end of a rod 53 extending forwardly from one arm of the yoke 34.

Slidably mounted upon the flanged bar 28 is a weight 54 which can be adjusted toward or away from the shaft 15 and the pivotal axis of the frame. Thus the degree of pressure of the saw upon the work and the rate of cutting can be varied to suit the requirements. Secured to the standard or upright 43 is a pivoted latch 55 which can hold the frame 27 in its upper position to hold the saw away from the table.

The operation of the mechanism above described will now be briefly explained. When the work has been clamped in position by means of the clamping blocks 47 and the operator is ready to start the saw he shifts the hand lever 24 rearwardly or in the direction of the pulley and shaft 15, shifting the sleeve or collar 22. This movement of the sleeve brings the widest portions of the cam faces of the sleeves 13 and 22 opposite each other and consequently shifts the sleeve 22 and the pulley 17 toward the fixed sleeve or collar 18 upon the ends of the shaft until the clutch teeth 19 and 20 interlock as is shown in the drawings. The pitman and saw will then reciprocate and the sawing operation takes place. The top and bottom of the yoke 34 of the saw are held in perfect alinement by the studs or projections 35 which engage the bosses 32 on the lower portions of the frame 27, and by the clamping block which engages the upper portions of the yoke 34 and the rod 37, which reciprocates in the upper part of the frame 27. The saw is fed downward due to the weight of the pivoted frame 44, the weight being adjustable as is explained above. When the cut is completed and the saw passed below the top of the table or frame 10, the end of the projection 52 strikes the upwardly projecting arm 26 of the shaft 25 tripping the lever 24, shifting the rod 23 and cam sleeve 22, and permitting the spring to move the pulley away from the collar 18 until the clutch teeth are out of engagement.

I do not desire to be confined to the exact details shown but aim in my claims to cover all modifications, which do not involve a departure from the spirit and scope of my invention.

What I claim is,—

1. In a hack saw, a table, a driving shaft mounted on said table, a vertically arranged supporting frame comprising a top bar provided with a pair of downwardly extending arms having openings in their lower ends, an arm rigidly connected at one end to one of said downwardly extending arms, and at its other end pivotally supported on said table, a yoke shaped saw carrying frame provided at its lower end with studs adapted to fit into and slide freely in the openings in the arms of the supporting frame, means for holding said saw carrying frame against lateral displacement, and means operatively connecting said saw frame with the driving shaft.

2. In a hack saw, a table, a driving shaft mounted on said table, a vertically arranged frame comprising a top bar provided with a pair of downwardly extending arms having openings in their lower ends, an arm rigidly connected at one end to one of said downwardly extending arms and at its other end pivotally supported on said table, a yoke shaped saw carrying frame provided at its lower end with studs adapted to fit into and slide freely in the openings in the arms of the supporting frame, means for holding said saw carrying frame against lateral displacement within said supporting frame, means operatively connecting said saw carrying frame with the driving shaft, and a pair of guides arranged to receive the end of the supporting frame between them, one of said guides being rigidly mounted on said table, and the other guide being adjustable toward the rigid guide for the purpose set forth.

In testimony whereof, I sign the foregoing specification, in the presence of two witnesses.

CHARLES W. BERGMANN.

Witnesses:
  VICTOR C. LYNCH,
  N. L. McDONNELL.